United States Patent

[11] 3,588,125

[72] Inventor Frank J. Mastromatteo
 Dayton, Ohio
[21] Appl. No. 735,811
[22] Filed June 10, 1968
[45] Patented June 28, 1971
[73] Assignee The Duriron Company, Inc.
 Dayton, Ohio

[54] RING SEAL ASSEMBLY
 10 Claims, 7 Drawing Figs.
[52] U.S. Cl. ................................... 277/26,
 277/59, 277/222
[51] Int. Cl. ...................................... F16j 9/00,
 F02f 5/00
[50] Field of Search ........................... 277/26,
 222, 59

[56] References Cited
 UNITED STATES PATENTS
3,259,392 7/1966 Peickii et al. ............... 277/177X 3,390,889 7/1968 Grover ............... 277/198

OTHER REFERENCES
Journal of Teflon, Vol. 6, No. 6, Aug. 1965, (pages 4 to 7) Piston Ring Seals of Teflon, by H. A. Traub Primary Examiner—Samuel B. Rothberg
Attorney—Marechal, Biebel, French & Bugg ABSTRACT: A seal assembly for a shaft and a housing wherein one rotates relative to the other includes a filled polytetrafluoroethylene (PTFE) seal element which is split and includes flexible and movable overlapping free ends in opposed sealing relation at ambient temperature. As the temperature increases, the seal element tends to grow so that one of the free ends seals against one of the radial faces of the seal element. As the temperature drops from ambient the seal contracts so that the opposed faces are in sealing engagement. The seal is energized into sealing engagement by the fluid being sealed.

Reference is made to application Serial No. 735,812, filed of even date herewith and assigned to the same assignee.

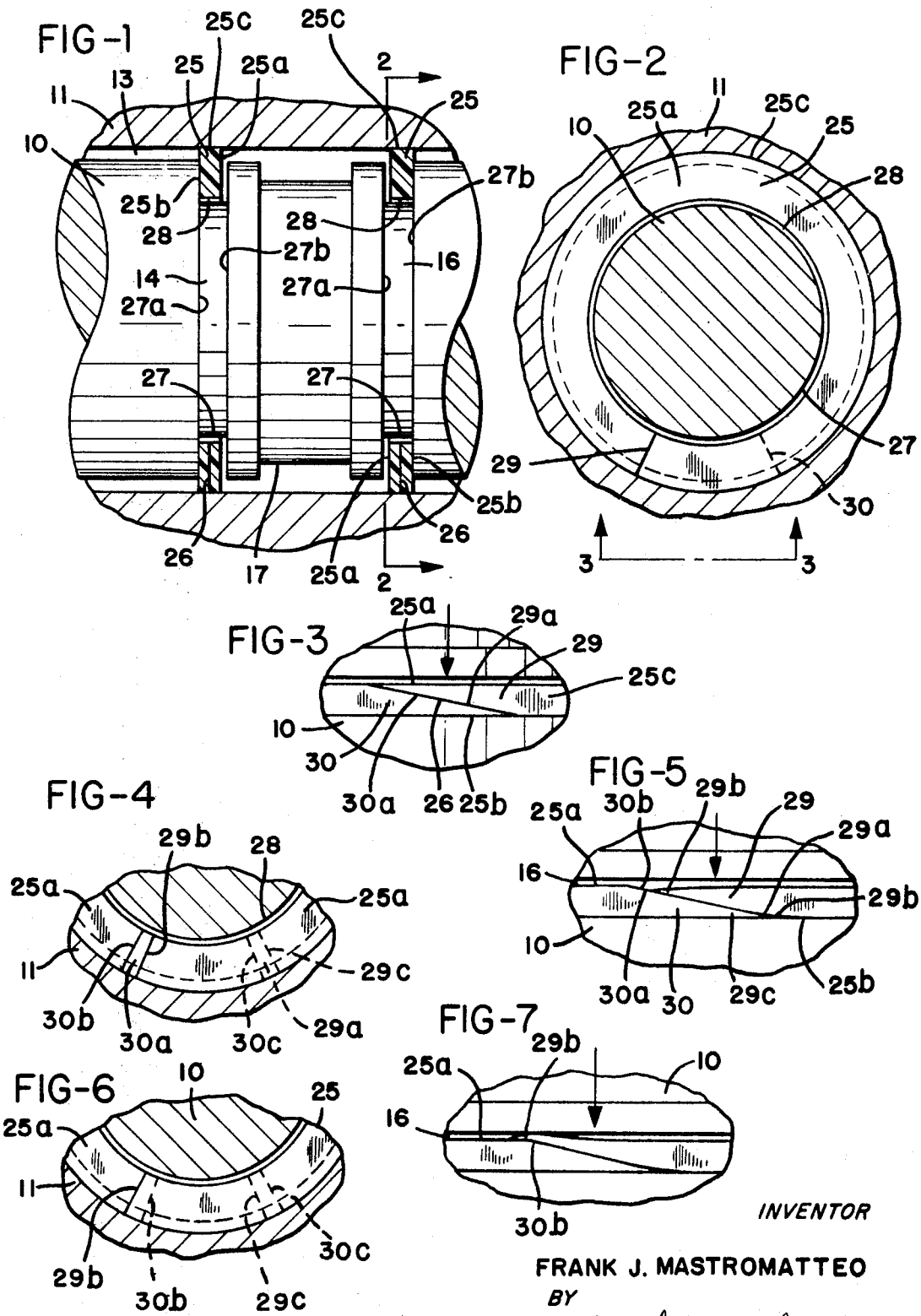

RING SEAL ASSEMBLY

BACKGROUND OF THE INVENTION

This invention relates to a seal assembly and more specifically to an improved seal assembly for use over a wide temperature range.

The use of fluorocarbon resins as seal elements is well known. Commonly used materials are polytetrafluoroethylene and tetrafluoroethylene and hexafluoropropylene copolymers. The seal element, be it an O-ring or flat gasket-type ring or lip seal is usually urged into sealing engagement by a resilient energizing member, and the seal element usually substantially completely fills the groove or recess in which it is received.

One of the problems associated with the use of fluorocarbon seal elements is the relatively high coefficient of linear thermal expansion. For example, unfilled PTFE has a coefficient of $5.5 \times 10ah1^5$ in./in./° F. in the range of 73° to 140° F., in the case of the copolymer, the value is 4.6 to $5.8 \times 10^5$ in./in./° F. over the same temperature range. Using fillers reduces the effective coefficient to a value between about 3.8 to $4.5 \times 10^5$, for example. Thus, PTFE has a coefficient about 10 times that of most grades of steel. In those instances in which the part is to be exposed to wide variations in temperature, e.g., −40° to 350° F. the lineal growth per inch over that range of temperature is about 0.0215 inch. For a seal element of a 2-inch outside diameter, the total lineal growth over the range is 0.136 inch, or 0.043 inch diametrically for the range.

The difficulties associated with change in dimension of PTFE parts is further compounded by the fact that the linear coefficient of expansion varies for different temperatures, e.g.

| | |
|---|---|
| 77 to 32° F | $11.1 \times 10^{-5}$ |
| 50 to 68° F | $8.9 \times 10^{-5}$ |
| 68 to 77° F | $43.0 \times 10^{-5}$ |
| 77 to 86° F | $8.9 \times 10^{-5}$ |
| 77 to 302° F | $7.5 \times 10^{-5}$ |

From this data it becomes clear the rate of growth over the range of 68° F. to 77° F. is significantly higher than the remaining range of temperature. The lineal growth over that range is 0.0039 inch per inch. Therefore, the same seal element supra, has a lineal growth of 0.0285 inch in the range of 68° to 77° F., corresponding to a diametrical change of 0.009 inch. This data is significant because it shows that cooling a 2-inch seal element from 77° F. to 68° F, the diametrical shrinkage is approximately 0.009 inch.

One approach to limiting the effect in changes of seal dimension has been to confine the seal element mechanically over the entire range of temperatures so that the seal is unable to move. While such designs are effective, they are also complicated and expensive thus limiting the use of PTFE to those installations in which no other material will operate satisfactorily.

Another approach has been to proportion the seal element so that it seals efficiently at lower temperatures, and as the temperature increases, the dimension of the seal increases, and in some instances deforms or is wedged between the surface to be sealed so that it cannot contract as the temperature is reduced. Ultimately, such a seal becomes inefficient even at the higher temperature.

A typical example of a seal arrangement exposed to wide variations in both temperature and pressure is the internal seals for hydraulically controlled automatic transmissions for automobiles and the like. The basic elements of a transmission of this type are: (1) a hydraulic torque converter, (2) a planetary gearset, (3) multiple-disc clutches, (4) sprag clutches, (5) bands, and associated valves, pumps and control elements for flow of hydraulic fluid which controls the transmission operation. The hydraulic pressure may vary from zero to almost 200 p.s.i. while the temperature may vary from −40° F. to 350° F. Within the transmission there are several seals, with adjacent seals defining the hydraulic flow path to various elements of the transmission. For example, there are two seals between the front plate of the pump assembly and the forward clutch to control operation of the forward clutch, and four seals forming three passageways between the support housing for the intermediate clutch and sprag and the direct clutch housing. These three passages control operation of the direct clutch, the front band and the intermediate sprag.

Currently, the seals used are split metallic rings which permit some leakage of fluid, but which are sufficiently tight to effect operation of the various clutches, bands and sprags. Since there is some loss of pressure, the pump used to supply the pressure must be sufficiently large to provide the various pressures in addition to the pressure lost through seal leakage.

SUMMARY OF THE INVENTION

In accordance with the present invention, a relatively simple seal assembly is provided which overcomes some of the difficulties associated with the use of PTFE in seal assemblies, and which is effective as a sealing element without the use of an energizing member and operates over a wide range of temperatures. Seal assemblies of the present invention are particularly useful in hydraulically controlled automatic automotive transmissions wherein the hydraulic fluid to be sealed operates as the energizing medium to establish a sealing relation through the seal element.

The seal assembly of the present invention includes a seal element of PTFE material which is in the form of an annular split disc having spaced radial faces, the outer periphery of the disc forming the sealing face. The seal element is received in a groove on the shaft, the inner peripheral dimension thereof being sufficiently larger than the peripheral dimension of the base of the groove on the shaft to form an annular chamber, the inner periphery of the seal element being spaced from the base of the groove. The seal element is a split disc having movable and flexible free ends which are in opposed overlapped sealing relation at ambient temperatures. Each free end of the seal element includes an inclined face, which with the adjoining radial face forms an angle of 10° to 15° so that this section of the seal element is tapered and quite flexible. As the temperature increases above ambient, the seal element tends to grow. Since it includes freely movable ends, the seal element is free to grow and the opposed inclined faces are maintained in sealing engagement by the fluid being sealed. Any portion of the inclined face which projects over the opposed radial face is deflectable into sealing engagement therewith. As the temperature drops, the seal is free to contract with the opposed inclined surfaces again in sealing engagement if fluid pressure is applied. The cross-sectional dimension of the seal element is less than the width of the groove.

A seal is established by fluid under pressure, and as the fluid contacts the seal ring, it forces one radial face of the seal element into engagement with the groove wall, and enters between the inner periphery of the seal element and the groove forcing the seal element outwardly into tight sealing engagement with the housing.

Accordingly, it is a primary object of the present invention to provide an improved relatively simple seal assembly including a split type which may be energized to provide an efficient seal over a wide variety of pressures and temperatures.

Another object of this invention is to provide a seal assembly of the type described using a split PTFE seal element wherein the seal assembly is particularly useful in hydraulically actuated automotive transmissions of the automotive type.

Other objects and advantages of the present invention will be apparent from the following description, the accompanying drawings and the appended claims.

BRIEF DESCRIPTION OF THE DRAWINGS

FIG. 1 is a view partly in section and partly in elevation of the seal assembly of the present invention positioned on a rotating shaft;

FIG. 2 is a view in section taken along the lines 2–2 of FIG. 1;

FIG. 3 is an enlarged fragmentary section taken along the lines 3–3 of FIG. 2 showing the outer peripheral surface end of the seal element in accordance with the present invention;

FIG. 4 is an enlarged fragmentary view of a portion of FIG. 2 showing the relative position of portions of the seal element at temperatures below ambient;

FIG. 5 is a view similar to FIG. 3 illustrating the relative position of portions of the seal element at temperatures below ambient; and FIGS. 6 and 7 are views similar to FIGS. 4 and 5, respectively, illustrating the relative position of portions of the seal element at temperatures above ambient.

DETAILED DESCRIPTION OF THE INVENTION

Referring to FIG. 1, which illustrates a preferred embodiment of the invention, a seal arrangement is shown for a rotatable shaft 10 positioned within a housing 11, the shaft being spaced from the housing as indicated by clearance 13 therebetween. The shaft 10 is provided with spaced grooves 14 and 16, with the portion 17 of the shaft between the grooves forming a fluid flow channel. Positioned in each of the grooves 14 and 16 is a seal element 25 each of the same construction, although it is understood that the shaft may be provided with only one seal element, if a fluid flow channel is not used.

Each seal element 25 is in the form of an annular fluorocarbon member having spaced radial faces 25a and 25b, the seal member being split as indicated generally at 26. The outer peripheral surface 25c of the seal element is in sealing engagement with the opposed wall of the housing 11. The dimensions of the seal element 25 are coordinated with the dimensions of the grooves 14 and 16 as follows—Each groove has a base 27 of predetermined depth and sidewalls 27a and 27b spaced a predetermined distance apart. The inner peripheral dimension of the seal element is less than the diameter of the shaft 10 but sufficiently greater than the diameter of the base 27 of the groove to form an annular clearance or chamber 28 between the base and the groove and the inner periphery of the seal. Proportioned as described, at least a portion of the radial faces 25a and 25b of the seal elements overlaps a portion of the opposed spaced sidewalls 27a and 27b, respectively, of the groove. The cross-sectional dimension of the seal element, that is, the dimension as measured between the radial faces is less than the cross-sectional dimension or width of the groove as measured between the opposed sidewalls 27a and 27b. Preferably, the cross-sectional dimension of the seal element is at least 50 percent and preferably 60 percent that of the groove to prevent it from cocking or being distorted in the groove. Thus, the seal element is capable of limited lateral movement along the axis of the shaft 10.

Referring to FIGS. 2 and 3, it can be seen that the seal element 25 is split at 26 to provide free ends 29 and 30. The split is made by cutting a continuous seal blank, after it is formed by conventional PTFE processing, by bias cutting from the outer to the inner periphery or vice versa at a particular angle relative to the plane of the seal as will be described more fully below.

At ambient temperatures, the flexible and movable free ends of the seal which include inclined faces 29a and 30a are positioned in opposed facing and overlapped relation, as shown and care should be taken upon installation to assure that the faces 29a and 30a are in the relative position shown in FIG. 3. The angle between the inclined face and the adjoining radial face, that is, between faces 25b and 30a, and between 25a and 29a is less than 45° and preferably between 10° and 15° in order to provide readily flexible free ends which are easily responsive to fluid pressure so that the ends are maintained in sealing engagement with each other upon application of pressure.

The operation of the seal assembly under fluctuations in temperature can be understood with reference to FIGS. 4 and 5. As the temperature of the seal decreases, the free ends 29 and 30 are free to move so that the tip end 29b of end 29 is spaced from the junction 30b between radial face 25a and the inclined face 30a. Similarly the tip end 30c of end 30 is spaced from the junction 29c between radial face 25b and inclined face 29a.

As the temperature of the seal assembly increases, the ends of the seal pass through the relative position shown in FIGS. 2 and 3. As the temperature increases further, the ends of the seal assume the relative positions generally shown in FIGS. 6 and 7 wherein the same reference numerals have been used. At temperatures above ambient, the tip end 29b of end 29 extends beyond junction 29c while a portion of each of the inclined faces remain in overlapped relation and the tip portion of face 29 is sealed against radial face 25a. Depending on the amount of growth of the seal element, tip end 30c of end 29 may or may not extend beyond junction 29c, although shown that way in FIG. 6 for purposes of illustration.

Typical dimensions of the seal assembly of the present invention are as follows: Assuming a groove dimension of 0.095 inch depth and 0.095 inch width, the seal element is a cross-sectional dimension of between 0.096 inch to 0.102 inch between its inner and outer peripheral surfaces. The dimensions between the radial faces is between 0.060 inch to 0.065 inch. The clearance between the inside periphery 28 of the seal element and the base of the groove 27 is approximately 0.015 inch. The angle between the inclined face and the radial face is 12°+1°−2°. Assuming a seal ring having a 2-inch inside diameter, the total lineal growth in the range of 68° to 77° F. is approximately 0.0285 inch. Since a lineal change of 0.0285 inch represents a diametrical change of about 0.009, it is preferred that upon installation, there be a tight fit, and preferably the interference fit with the ring being a few thousandths of an inch and possibly 0.010 of an inch greater than the dimension of the housing. In this way, as the seal element contracts, it remains in sealing engagement as described. As the temperature begins to increase, the seal element grows, that is, expands both in circumference and in cross section so that sealing pressure is maintained at the higher temperature.

The operation of the seal may be understood with reference to FIGS. 1 and 5, the latter showing the flow path of fluid which is to be sealed against. Fluid flowing through chamber 17 passes between the shaft and the housing and contacts the face 25a of the seal element forcing the opposite face 25b into contact with sidewall 27a of the left groove or sidewall 27b of the right groove. Additionally, fluids flows into the chamber 28 and acts on the inside peripheral surface of the seal element to force it radially outwardly towards the housing, and thus forcing the outside peripheral surface of the seal element in tight sealing engagement with the housing.

In the case of a transmission of the type described, at cold temperatures, the hydraulic fluid is generally quite viscous so that even if the seal assembly has contracted substantially, there is very little leakage of fluid between the seal element and the housing. As the temperature of the hydraulic fluid increases, the seal element expands and seals it tightly.

A seal assembly of the type herein described is quite effective in automotive transmissions of the type described particularly because of the ability to seal in response to different pressures, which in the case of automotive transmission may vary from 0 to well over 200 p.s.i. A comparative test of the seal element of the type described against solid seal elements without an energizer, or split seal elements, or lap seal elements indicates that the seal element of the present invention is considerably more efficient at the lower temperatures. Seal assemblies in accordance with the present invention operated quite satisfactorily in a static and dynamic seal test and at temperatures as low as −40°, and at temperatures as high as 300° F.

It is preferred in accordance with the present invention that the seal element be of polytetrafluoroethylene, preferably filled with a finely divided material such as glass, molybdenum, graphite, bronze, coke flour, asbestos, copper or mixtures thereof. A particularly good seal element has been obtained with the use of finely divided glass present in an amount of 15 percent by weight. In view of the high temperature capability of polytetrafluoroethylene as opposed to the fluorocarbon copolymer previously mentioned, polytetrafluoroethylene offers a distinct advantage.

While the form of apparatus herein described constitutes a preferred embodiment of the present invention, it is to be understood that this invention is not limited to this precise form of apparatus and that changes may be made therein without departing from the scope of the invention which is defined in the appended claims.

I claim:

1. In a seal assembly for use over a wide range of temperatures establishing and maintaining a seal between a shaft and a housing one of which is rotatable relative to the other by being energized into sealing engagement solely by the fluid to be sealed, said housing and shaft having a coefficient of thermal expansion different from the seal element, and wherein said shaft includes groove means having a base of a predetermined depth and sidewalls spaced a predetermined width for reception of said seal assembly, the improvement comprising a split annular fluorocarbon seal element having spaced radial faces received within said groove means and having an outer peripheral surface in sealing contact with said housing, the inner peripheral dimension of said seal element being less than the diameter of said shaft and greater than the diameter of the base of said groove to provide an overlapping area between said radial faces and the opposed sidewall while providing an annular chamber between the inner peripheral surface of said seal element and the base of said groove, the cross-sectional dimension of said seal element being less than the width of said groove so that fluid pressure is operative to urge one of said radial faces into sealing engagement with the opposed sidewall in said overlapping areas, said split seal element including flexible and movable free ends which are in opposed overlapped relation at ambient temperatures, each free end of said seal element including an inclined face forming an angle of less than 45° with the adjoining radial face, said seal element tending to contract in response to reduction in temperature from ambient temperatures whereby at least one of said free ends is in opposed relationship with the adjoining radial face, said seal element tending to expand in response to increase in temperature above ambient temperature whereby at least one of said free ends is in opposed sealing relationship with the opposed inclined face of the other free end of said seal element.

2. The seal assembly as set forth in claim 1 wherein said seal element is polytetrafluoroethylene.

3. The seal assembly as set forth in claim 1 wherein said seal element is polytetrafluoroethylene filled with a material selected from the group consisting of glass, molybdenum, graphite, bronze, coke flour, asbestos, copper and mixtures thereof.

4. The seal assembly as set forth in claim 2 wherein said polytetrafluoroethylene is filled with 15 percent glass.

5. The seal assembly as set forth in claim 1 wherein the angle between the inclined face and the adjoining radial face of each free end is the same.

6. The seal assembly as set forth in claim 1 wherein the cross-sectional dimension of said element is at least 50 percent the width of said groove.

7. The seal assembly as set forth in claim 5 wherein the angle between the inclined face and the adjoining radial face of each free end is between 10° and 15°.

8. A seal assembly as set forth in claim 7 wherein the cross-sectional dimension of said seal element is at least 60 percent of the width of said groove.

9. A seal assembly as set forth in claim 7 wherein said seal element is of polytetrafluoroethylene filled with 15 percent by weight of particulate finely divided glass.

10. A seal assembly as set forth in claim 1 wherein said shaft includes multiple spaced said grooves, each said groove including one of said seal elements.